United States Patent Office 2,978,369
Patented Apr. 4, 1961

2,978,369

SOLDERING FLUXES

James H. Battle, Bronx, Carl H. Hack, Flushing, and Otto König, Forest Hills, N.Y., assignors to National Lead Company, New York, N.Y., a corporation of New Jersey No Drawing. Filed Mar. 6, 1958, Ser. No. 719,488

6 Claims. (Cl. 148—23)

This invention relates to solder fluxes and has particular reference to solder flux compositions of uniform concentration having less corrosive properties, and the use of which results in a greater solder flow area than previously known fluxes.

Inorganic halide fluxes such as zinc chloride, often containing a small proportion of ammonium chloride and hydrochloric acid, have long been used and preferred for fast and efficient soldering operations. These fluxes are efficient in removing films or coatings of oxide from the surface of the metals to be soldered and aid materially in the production of strongly soldered joints. Such fluxes, however, have the disadvantage of leaving residues which readily hydrolyze in the presence of moisture to form halogen acids which may then attack the exposed metal adjacent to the joint. This corrosive action of inorganic halide fluxes renders them unsuitable for many applications.

To overcome the disadvantage of corrosive flux residues, certain organic fluxes have been proposed which are characterized by being somewhat less corrosive. These compounds have generally been organic bases containing a halogen salt such as an organic amine hydrohalide. Such salts, however, generally have very poor fluxing action in comparison to the inorganic halide fluxes. Furthermore, these organic fluxes frequently leave black gummy residues which are difficult to remove and which are corrosive under certain conditions. Another disadvantage of these fluxes is that they have often been composed of substances known to be poisonous.

One of the more recent solder flux compositions used comprised an ammonium halide, substituted ammonium halide together with any one of several tetramethylol compounds. These compositions provided a partial answer to the problems previously mentioned, but it was determined that in order for that soldering flux composition to be commercially feasible it would have to be shipped as a concentrate to reduce the volume and weight shipped, and to thus reduce the cost to a point which made it economically sound. This shipping of that solder flux composition as a concentrate resulted in an unforeseen disadvantage in that the concentrate during shipping and storage was subjected to drops in temperature in certain parts of the country, and the commercially acceptable tetramethylol compounds used would precipitate out, unknown to the consumer, and result in a diluted solution with attendant disadvantages thereto.

The tetramethylol compounds used were found to leave a black residue, and while it was believed that the tetramethylol compounds used also protected the metal surfaces at the soldered joint, failures of the soldering process, when they did occur, were attributed to the solder flux composition, and in particular, to the residue left on the surface to be soldered.

In addition, the purity of the tetramethylol compounds used was difficult to control. The impurities which were present were found to be insoluble in the solvent used, and the amounts of the impurities present varied from batch to batch of tetramethylol compound. In order to eliminate these impurities special grades of the tetramethylol compounds had to be prepared.

The object of the present invention is to provide an improved solder flux composition. Another object is to provide an improved solder flux composition having a uniform concentration at all atmospheric temperatures normally encountered. Still another object is to provide an improved solder flux composition having a uniform concentration at all atmospheric temperatures normally encountered and leaving substantially no residue upon use. Still another object is to provide an improved solder flux composition having a uniform concentration at all normally encountered atmospheric temperatures, and leaving substantially no residue upon use, being substantially free from insoluble impurities, and having less corrosive properties than previously known fluxes.

Still another object is to provide an improved solder flux composition having a uniform concentration at all normally encountered atmospheric temperatures, leaving substantially no residue upon use, being substantially free from insoluble impurities, having less corrosive properties than previously known fluxes, and resulting in a greater solder flow area.

Other objects and advantages will become apparent from the following more complete description and claims.

Broadly, this invention contemplates a substantially residue-free solder flux solution consisting essentially of two components, the first component being selected from the class consisting of ammonium halides and substituted ammonium halides, and as a second component hydrobromic acid.

More specifically, the flux compositions of this invention comprise, as a first component, an ammonium halide or substituted ammonium halide, including among such compounds the salts of ammonium chloride, ammonium bromide, ethylamine hydrobromide, triethanolamine hydrobromide, hexamethylenetetramine hydrobromide and similar compounds, and as a second component, hydrobromic acid.

The inorganic halogen acid used, must be one which will provide a cleaning and pickling action in one operation. It must leave substantially no residue when being used, and it must be capable of being vaporized off at the temperature employed in the soldering process. The acid used must have a solubility in water, greater than five grams per one hundred grams of water.

Hydrofluoric acid was found to be too corrosive and extremely hazardous to handle and in addition, reacted with the metal to be soldered, resulting in the formation of fluoride salts. These fluoride salts formed a crust and severely inhibited the flow of solder. Hydriodic acid was found to be too expensive, exhibited too strong an oxidizing effect and actually interfered with the flow of solder. A solder flux solution using hydrochloric acid was found to be deficient in the amount of solder flow realized when employing the hydrochloric acid containing solution in a soldering operation.

Hydrobromic acid, on the other hand, was found to be completely satisfactory for use in a solder flux solution. The use of hydrobromic acid in a flux solution was found to greatly increase the solder flow area and hydrobromic acid was found to have met all of the requirements mentioned above, for the inorganic halogen acid to be operable in a solder flux solution.

The hydrobromic acid may be present in amounts of from 0.25% to 25.0% by weight of the solder flux solution. Using amounts of the acid below 0.25%, the solder flux composition does not do an adequate job. While the amount of hydrobromic acid may be taken over the 25% level, all the excess acid will not be volatilized in the time needed to complete the soldering process at a given temperature, as it would for a lesser amount of the acid; the excess acid will be corrosive as to the soldered material; and consequently there is no market for a solder flux composition containing greater than 25% of the acid by weight.

The ammonium halide or substituted ammonium halide may be present in amounts of from 0.25% to 25.0% by weight of the solder flux solution. If an amount of the ammonium halide or substituted ammonium halide below 0.25% is used, the solder flux composition does not do an adequate job. If an amount above 25.0% is used, it leads to the formation of a residue.

The complete range of the ammonium halide or substituted ammonium halide is operable with the complete range of hydrobromic acid.

The flux composition may be prepared by ordinary methods of blending without difficulty. This composition may be employed by dissolving it in a suitable liquid or vehicle such as water, alcohol, or other solvent. It is preferable, however, to employ water as the vehicle for the flux composition because of the increased economy obtained, the greater solubility of the salts in water, and the elimination of the fire hazard. Heretofore, wetting agents have commonly been employed in flux solutions and they may be employed with the present invention if desired.

In order to more fully illustrate the nature of this invention and the manner of practicing the same, the following examples are presented.

Example I

A flux composition was prepared by blending 21 grams of ethylamine hydrobromide with 20 grams of hydrogen bromide as hydrobromic acid. This composition was mixed with enough water to make 1 liter of a flux solution.

Example II

A flux composition was prepared by blending 2.5 grams of ethylamine hydrobromide with 20 grams of hydrogen bromide as hydrobromic acid. This was added to enough water to make 1 liter of a flux solution.

Example III

A flux composition was prepared by mixing 20 grams of ammonium bromide and 20 grams of hydrogen bromide as hydrobromic acid. This was mixed with enough water to make 1 liter of a flux solution.

Example IV

A flux composition was prepared by mixing 20 grams of ammonium iodide and 20 grams of hydrogen bromide as hydrobromic acid. This was mixed with enough water to make 1 liter of a flux solution.

Example V

A flux composition was prepared by blending 20 grams of hexamethylenetetramine hydrobromide and 20 grams of hydrogen bromide as hydrobromic acid. This was dissolved in enough water to make 1 liter of a flux solution.

Example VI

A flux composition was prepared by blending 100 grams of ethylamine hydrobromide and 50 grams of hydrogen bromide as hydrobromic acid. This was mixed with enough water to make 1 liter of a flux solution.

Example VII

A flux composition was prepared by blending 2.5 grams of ethylamine hydrobromide and 2.5 grams of hydrogen bromide as hydrobromic acid. This was mixed with enough water to make 1 liter of a flux solution.

Example VIII

A flux composition was prepared by blending 250 grams of ethylamine hydrobromide and 250 grams of hydrogen bromide as hydrobromic acid. This was mixed with enough water, so that the total weight of the flux solution was 1,000 grams.

Example IX

A flux composition was prepared by blending 5 grams of ethylamine hydrobromide and 5 grams of hydrogen bromide as hydrobromic acid. This was mixed with enough water, so that the flux solution was made up to a 1% concentration.

Example X

A flux solution was prepared by blending 5 grams of ammonium bromide and 5 grams of hydrogen bromide as hydrobromic acid, and a flux solution obtained by mixing this in enough water to make 1 liter of a flux solution.

To illustrate the advantages of the flux compositions of the instant invention, the flux solutions prepared in the above examples were employed in soldering tests. The solutions were brushed onto a copper sheet 1.5 x 1.5 x 1/32 inches, and a button of solder weighing, in each case, 0.52 gram was placed on the copper sheet. The copper sheet was placed on a wire gauze and heated over a Bunsen flame until the incipient melting of the solder button. A short time later (30 seconds) the flame was withdrawn and the sheet allowed to cool. The size of the soldered area was measured by means of a planimeter. For comparison purposes, a typical prior art flux solution consisting of 40 grams of ethylamine hydrochloride dissolved in 1 liter of water was similarly tested.

Various other controls were used consisting of ethylamine hydrochloride dissolved in water. The amount of the ethylamine hydrochloride used varied from 0.25% to 25% by weight of the solder flux solution.

The solder flow area, measured in square inches, using the solder flux solutions of the present invention was found to have been substantially increased when compared to a corresponding control using the same weight percentage of the ethylamine hydrochloride as the weight percentage of the active ingredients in the present invention.

In addition, a solder flux solution was prepared using 40 grams of ethylamine hydrochloride and 50 grams of a tetramethylol compound namely pentacrythritol. This was dissolved in 1 liter of water, with some difficulty, in that there was a white insoluble material present, and the solution had to be filtered to remove this insoluble residue. Upon employing this solder flux composition in soldering tests, a residue was found to remain which was at least 100% greater than any residue obtained using the solder flux composition of this invention.

The foregoing examples demonstrate the substantial improvement in solder flux solutions employing the flux compositions of the instant invention. The spreading power of non-corrosive fluxes has been greatly increased and this property is found even in very weak solutions of the flux composition. Where flux solutions of higher concentrations are employed, the spreading power of the flux solutions has been increased from 100 to 400%. Furthermore, the flux solutions leave substantially no residue and eliminate the possibility of a residue interfering with the soldering process. The components of this solder flux solution contain no insoluble impurities. The use of hydrobromic acid results in the cleaning and pickling operations being carried out in one step, without the need for a preparatory cleaning operation.

While this invention has been described in terms of certain preferred embodiments and illustrated by means of specific examples, these are illustrative only, and the invention is not to be construed as limited, except as set forth in the following claims.

We claim:
1. A substantially residue-free solder flux solution consisting essentially of two components, the first component being selected from the class consisting of ammonium halides and substituted ammonium halides, and as a second component hydrogen bromide as uncombined hydrobromic acid, said first component being present in amount from 0.25 to 25% based on the weight of said solder flux solution, said hydrogen bromide in the form of uncombined hydrobromic acid being present in amount from 0.25 to 25% based on the weight of said solder flux solution, said solder flux solution exhibiting a decidedly acid pH value.

2. A substantially residue-free solder flux solution according to claim 1, wherein said first component is ethylamine hydrobromide.

3. A substantially residue-free solder flux solution according to claim 1, wherein said first component is ammonium bromide.

4. A substantially residue-free solder flux solution according to claim 1, wherein said first component is ammonium iodide.

5. A substantially residue-free solder flux solution according to claim 1, wherein said first component is hexamethylenetetramine hydrobromide.

6. A substantially residue-free solder flux solution according to claim 1, wherein the solvent used for said first component is water.

References Cited in the file of this patent
UNITED STATES PATENTS

| | | |
|---|---|---|
| 2,803,572 | Konig | Aug. 20, 1957 |

FOREIGN PATENTS

| | | |
|---|---|---|
| 413,141 | Great Britain | July 12, 1934 |